(12) United States Patent
Cheng

(10) Patent No.: US 10,926,356 B2
(45) Date of Patent: Feb. 23, 2021

(54) SYSTEM AND METHOD FOR POWDER BED FUSION ADDITIVE MANUFACTURING WITH DYNAMIC ROLLER ROTATIONAL SPEED ADJUSTMENT

(71) Applicant: Robert Bosch GmbH, Stuttgart (DE)

(72) Inventor: Bo Cheng, Malden, MA (US)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 16/058,160

(22) Filed: Aug. 8, 2018

(65) Prior Publication Data

US 2020/0047286 A1 Feb. 13, 2020

(51) Int. Cl.

| B23K 26/342 | (2014.01) |
|---|---|
| B33Y 10/00 | (2015.01) |
| B33Y 30/00 | (2015.01) |
| B23K 26/14 | (2014.01) |
| B23K 26/00 | (2014.01) |
| B23K 26/08 | (2014.01) |
| B33Y 50/02 | (2015.01) |

(52) U.S. Cl.
CPC ........ *B23K 26/342* (2015.10); *B23K 26/0093* (2013.01); *B23K 26/08* (2013.01); *B23K 26/1464* (2013.01); *B33Y 10/00* (2014.12); *B33Y 30/00* (2014.12); *B33Y 50/02* (2014.12)

(58) Field of Classification Search
CPC .................................................. B29C 64/218
See application file for complete search history.

(56) References Cited

U.S. PATENT DOCUMENTS

| 7,389,154 B2 | 6/2008 | Hunter et al. | |
|---|---|---|---|
| 2006/0118532 A1* | 6/2006 | Chung | B29C 64/153 219/121.85 |
| 2015/0343533 A1* | 12/2015 | Park | B22F 3/18 425/78 |
| 2015/0367415 A1* | 12/2015 | Buller | B22F 3/004 419/53 |

(Continued)

OTHER PUBLICATIONS

Haeri, S. et al. "Discrete element simulation and experimental study of powder spreading process in additive manufacturing." Powder Technology 306 (2016): 45-54. Elsevier B.V.

*Primary Examiner* — Ibrahime A Abraham
*Assistant Examiner* — John J Norton
(74) *Attorney, Agent, or Firm* — Maginot, Moore & Beck LLP

(57) ABSTRACT

A powder bed fusion additive manufacturing system includes a build platform on which a substrate is supported, an energy generator configured to generate an energy beam directed at the substrate, a roller having an actuator system configured to rotate the roller, and a controller operably connected to the roller and to the energy generator. The controller is configured to produce a build object by rotating the roller at a first rotational speed to spread powder particles at a first porosity, operating the energy generator to selectively melt the powder particles to form a first layer of the build object, rotating the roller at a second rotational speed to spread powder particles at a second porosity, and operating the energy generator to selectively melt the powder particles spread at the second porosity to form a second layer. The first and second rotational speeds are different from one another.

20 Claims, 9 Drawing Sheets

(56) References Cited

U.S. PATENT DOCUMENTS

2016/0368054 A1* 12/2016 Ng .................... B29C 64/393
2018/0004192 A1    1/2018 Perret et al.
2018/0326491 A1* 11/2018 Koike .................. B22F 3/24

* cited by examiner

SYSTEM AND METHOD FOR POWDER BED FUSION ADDITIVE MANUFACTURING WITH DYNAMIC ROLLER ROTATIONAL SPEED ADJUSTMENT

TECHNICAL FIELD

This disclosure relates generally to additive manufacturing systems, and more particularly to powder bed fusion additive manufacturing systems.

BACKGROUND

Powder bed fusion processes, such as selective laser melting (SLM) and electron beam melting (EBM), are emerging manufacturing technologies that can fabricate engineering components with full density and complex structures in a layer-by-layer fashion. A typical powder bed fusion process begins with a processor slicing a computer-aided design (CAD) model into multiple thin layers, each having a given thickness. The sliced digital data is then used for the fabrication.

For fabricating the build object, the system is operated to produce a thin powder layer on a substrate, which is typically a previously solidified layer of the build object. A high-energy beam, for example a laser beam or an electron beam, then selectively irradiates the top surface of the freshly deposited powder bed based on the layered part contour information determined by the sliced digital data, locally melting the powder and a portion of the layer below the powder into a melt pool. When the melt pool cools, it solidifies to fuse the newly added layer to the substrate. The process repeats until the entire build part is completed.

During an SLM or EBM process, a roller or blade is operated with given process parameters to spread the metal powder particles to form the powder bed. In conventional systems, the powder bed process parameters are typically left unchanged during an entire build to produce a constant melt pool dimension throughout the build. However, since the laser beam spot size is comparable to the powder particle size in the powder bed fusion processes, the localized powder bed density in the laser scanning domains play a critical role for energy transfer and the resulting properties of the finished build product.

What is needed therefore is an additive manufacturing system that enables manipulation of the powder bed properties so as to improve control over the properties of a build product.

SUMMARY

In one embodiment, a powder bed fusion additive manufacturing system comprises a build platform on which a substrate is supported, an energy generator configured to generate an energy beam directed at the substrate, a roller having an actuator system configured to rotate the roller, and a controller operably connected to the roller and to the energy generator. The controller is configured to produce a build object by: operating the actuator system based on desired properties of the build object to rotate the roller at a first rotational speed to spread powder particles at a first porosity on the substrate; operating the energy generator to selectively melt the powder particles and portions of the substrate adjacent the selectively melted powder particles to form a first layer of the build object on the substrate; operating the actuator system based on the desired properties of the build object to rotate the roller at a second rotational speed to spread powder particles at a second porosity on at least one of the substrate and the first layer, the second rotational speed being different from the first rotational speed; and operating the energy generator to selectively melt the powder particles spread at the second porosity to form a second layer of the build object on the at least one of the substrate and the first layer.

In some embodiments, the first rotational speed is between zero and 15 rad/s and the second rotational speed is between zero and 15 rad/s.

In another embodiment of the powder bed fusion additive manufacturing system, the controller is configured to operate the actuator system to dynamically adjust a rotational speed of the roller between zero and 15 rad/s on a layer-by-layer basis.

In a further embodiment, the controller is configured to maintain process parameters of the energy generator constant throughout the production of the build object.

In yet another embodiment, the actuator system is further configured to translationally move the roller. The controller is configured to operate the actuator system to move the roller at a constant translational speed while operating the actuator system to rotate the roller at the first rotational speed, and to operate the actuator system to move the roller at the constant translational speed while operating the actuator system to rotate the roller at the second rotational speed.

In another embodiment of the powder bed fusion additive manufacturing system, operating the actuator system based on desired properties of the build object to rotate the roller at the first rotational speed includes performing a first melt pool dimension adjustment that includes (i) determining first powder beds resulting from rotating the roller at a first plurality of rotational speeds using a discrete element method ("DEM") model simulation and (ii) determining layer properties of the first powder beds using a thermal computational fluid dynamics ("CFD") model simulation. Operating the actuator system based on desired properties of the build object to rotate the roller at the second rotational speed includes performing a second melt pool dimension adjustment that includes (i) determining second powder beds resulting from rotating the roller at a second plurality of rotational speeds using the DEM model simulation and (ii) determining layer properties of the second powder beds using the thermal CFD model simulation.

In some embodiments, the first melt pool dimension adjustment further comprises selecting the first rotational speed based on a first comparison of the layer properties of the first powder beds determined using the thermal CFD model, and the second melt pool dimension adjustment further comprises selecting the second rotational speed based on a second comparison of the layer properties of the second powder beds determined using the thermal CFD model.

In yet another embodiment, operating the actuator system based on desired properties of the build object to rotate the roller at the first rotational speed includes determining the first rotational speed based on information stored in memory associated with the controller, the information including results of a DEM model and a thermal CFD model for a variety of simulated rotational speeds. Operating the actuator system based on the desired properties of the build object to rotate the roller at the second rotational speed includes determining the second rotational speed based on the information stored in the memory.

In a further embodiment, a method of producing a build object with a powder bed fusion additive manufacturing system comprises operating an actuator system that is operably connected to a roller based on desired properties of the build object to rotate the roller at a first rotational speed to spread powder particles at a first porosity on the substrate that is supported by a build platform, and operating an energy generator to generate an energy beam directed at the powder particles to selectively melt the powder particles and portions of the substrate adjacent to the selectively melted powder particles to form a first layer of the build object on the substrate. The method further includes operating the actuator system based on the desired properties of the build object to rotate the roller at a second rotational speed to spread powder particles at a second porosity on at least one of the substrate and the first layer, the second rotational speed being different from the first rotational speed, and operating the energy generator to selectively melt the powder particles spread at the second porosity to form a second layer of the build object on the at least one of the substrate and the first layer.

In a one embodiment of the method, the first rotational speed is between zero and 15 rad/s and the second rotational speed is between zero and 15 rad/s.

In another embodiment, the method further comprises operating the actuator system to dynamically adjust a rotational speed of the roller between zero and 15 rad/s on a layer-by-layer basis.

In yet another embodiment, the method further comprises maintaining process parameters of the energy generator constant throughout the production of the build object.

Some embodiments of the method further comprise operating the actuator system to move the roller at a constant translational speed while operating the actuator system to rotate the roller at the first rotational speed, and operating the actuator system to move the roller at the constant translational speed while operating the actuator system to rotate the roller at the second rotational speed.

In a further embodiment of the method, operating the actuator system based on desired properties of the build object to rotate the roller at the first rotational speed includes performing a first melt pool dimension adjustment that includes (i) determining first powder beds resulting from rotating the roller at a first plurality of rotational speeds using a discrete element method ("DEM") model simulation and (ii) determining layer properties of the first powder beds using a thermal computational fluid dynamics ("CFD") model simulation. Operating the actuator system based on desired properties of the build object to rotate the roller at the second rotational speed includes performing a second melt pool dimension adjustment that includes (i) determining second powder beds resulting from rotating the roller at a second plurality of rotational speeds using the discrete element method ("DEM") model simulation and (ii) determining layer properties of the second powder beds using the thermal computational fluid dynamics ("CFD") model simulation.

In another embodiment, the first melt pool dimension adjustment further comprises selecting the first rotational speed based on a first comparison of the layer properties of the first powder beds determined using the thermal CFD model, and the second melt pool dimension adjustment further comprises selecting the second rotational speed based on a second comparison of the layer properties of the second powder beds determined using the thermal CFD model.

In one embodiment, operating the actuator system based on desired properties of the build object to rotate the roller at the first rotational speed includes determining the first rotational speed based on information stored in memory associated with the controller, the information including results of a discrete element method ("DEM") model and a thermal computational fluid dynamics ("CFD") model for a variety of simulated rotational speeds. Operating the actuator system based on the desired properties of the build object to rotate the roller at the second rotational speed includes determining the second rotational speed based on the information stored in the memory.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "comprising," "including," "having," and the like, as used with respect to embodiments of the disclosure, are synonymous. As used herein, the term "approximately" refers to values that are within ±20% of the reference value.

Figure 1:
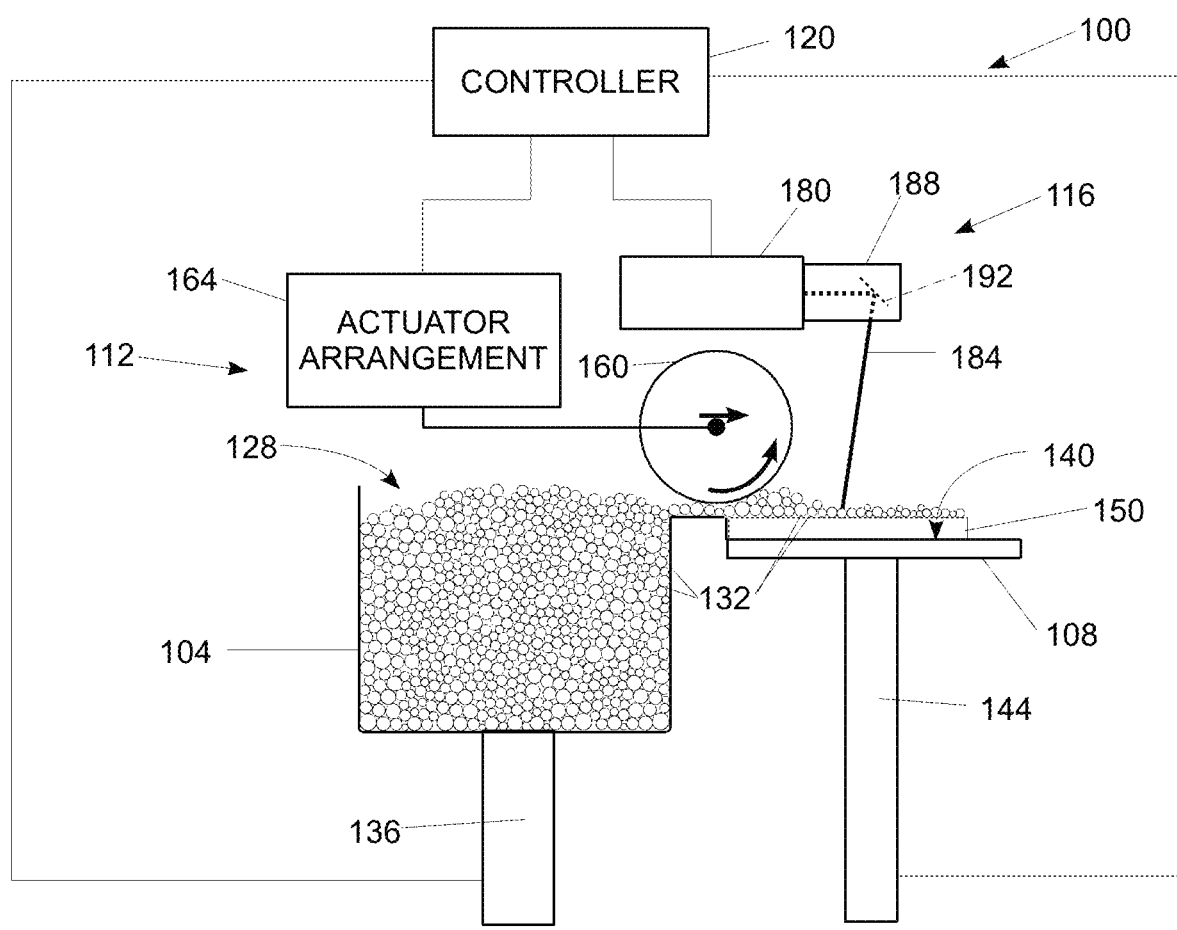
FIG. 1 is a schematic illustration of a powder bed fusion additive manufacturing system having a roller that is operated with a dynamically controlled rotational speed to produce a powder bed.

FIG. 1 schematically illustrates a powder bed fusion additive manufacturing system 100 according to the disclosure. The additive manufacturing system 100 includes a powder reservoir 104, a build platform 108, a spreading roller system 112, a melting device 116, and a controller 120.

The powder reservoir 104 defines a volume 128 in which a quantity of powder particles 132 are stored. The powder reservoir 104 may be formed as, for example, a rectangular or cylindrical receptacle, though other shapes may be used in different embodiments. In the illustrated embodiment, the powder reservoir 104 is depicted laterally adjacent to the build platform 108. In such an embodiment, the powder reservoir 104 may be supported by an actuator 136 configured to raise the powder reservoir 104 so that the powder particles 132 remain available as the particles 132 are depleted from the powder reservoir 104. In other embodiments, the powder reservoir 104 may be positioned vertically above the build platform 108 and configured such that the powder particles 132 are distributed onto the build platform 108 from above.

The build platform 108 includes a platform surface 140 and is operably connected to a build platform actuator 144. The platform surface 140 supports the build object 150 while the build object 150 is being constructed. The platform actuator 144 is configured to raise and lower the build platform 108 and the build object 150 so as to position the platform surface 140 at the desired vertical position for constructing the layers. In one embodiment, the platform actuator 144 is configured to lower the build platform 108 incrementally as each layer is completed so that the spreading system 112 and energy generator 116 can incrementally build the build object. In other embodiments, the spreading system 112 and energy generator 116 may be operated by an actuator to move vertically, while the build platform 108 may be stationary.

The spreading mechanism 112 includes a roller 160 and an actuator arrangement 164. The actuator arrangement 164 is operably connected to the roller 160 and is configured to rotate and translate the roller 160. In some embodiments, the actuator arrangement 164 includes one actuator configured to both translate and rotate the roller 160 via one or more transmission mechanisms, while in other embodiments, the actuator arrangement 164 has a first actuator configured to rotate the roller 160 and a second actuator configured to move the roller 160 laterally above the build platform 108.

In a further embodiment, the actuator arrangement 164 may be further configured to vertically translate the roller 160, either via the first or second actuators, or via an additional third actuator. The actuators of the actuator arrangement 164 may be any suitable actuator, for example electric AC, DC, brushed, brushless, stepper, servo, or linear motors, hydraulic actuators, pneumatic actuators, or any combination of the above.

The energy generator 116 is positioned vertically above the build platform 108 configured to selectively apply energy to the powder particles 132 on the build platform 108 to melt the powder particles 132. In the illustrated embodiment, the energy generator 116 includes an energy beam generator 180 that generates an energy beam 184 directed at a scanner system 188. The scanner system 188 includes at least one mirror 192 operably connected to a motor (not shown) that is controlled so as to move the mirror 192 to direct the energy beam 184 at the powder particles 132 that are to be melted. The energy beam generator 180 may be, for example, a laser, an electron beam generator, or another suitable mechanism for generating a focused energy beam. In some embodiments, the energy beam generator 180 may be oriented toward the powder particles 132 and may include, instead of the scanning system, one or more actuators that move the energy beam generator 180 to direct the energy beam 184 at the powder particles 132.

The controller 120 is operably connected to the motor system 144, the energy generator 116, and the actuators 136, 144, and the actuator arrangement 164. Operation and control of the additive manufacturing system 100 is performed with the aid of the controller 120. The controller 120 is implemented with general or specialized programmable processors that execute programmed instructions stored in a memory unit. The instructions and data required to perform the programmed functions are stored in the memory unit associated with the controller 120. The processors, the memory, and interface circuitry components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. The circuits described herein can also be implemented with a combination of processors, ASICs, discrete components, or VLSI circuits.

Figure 2:
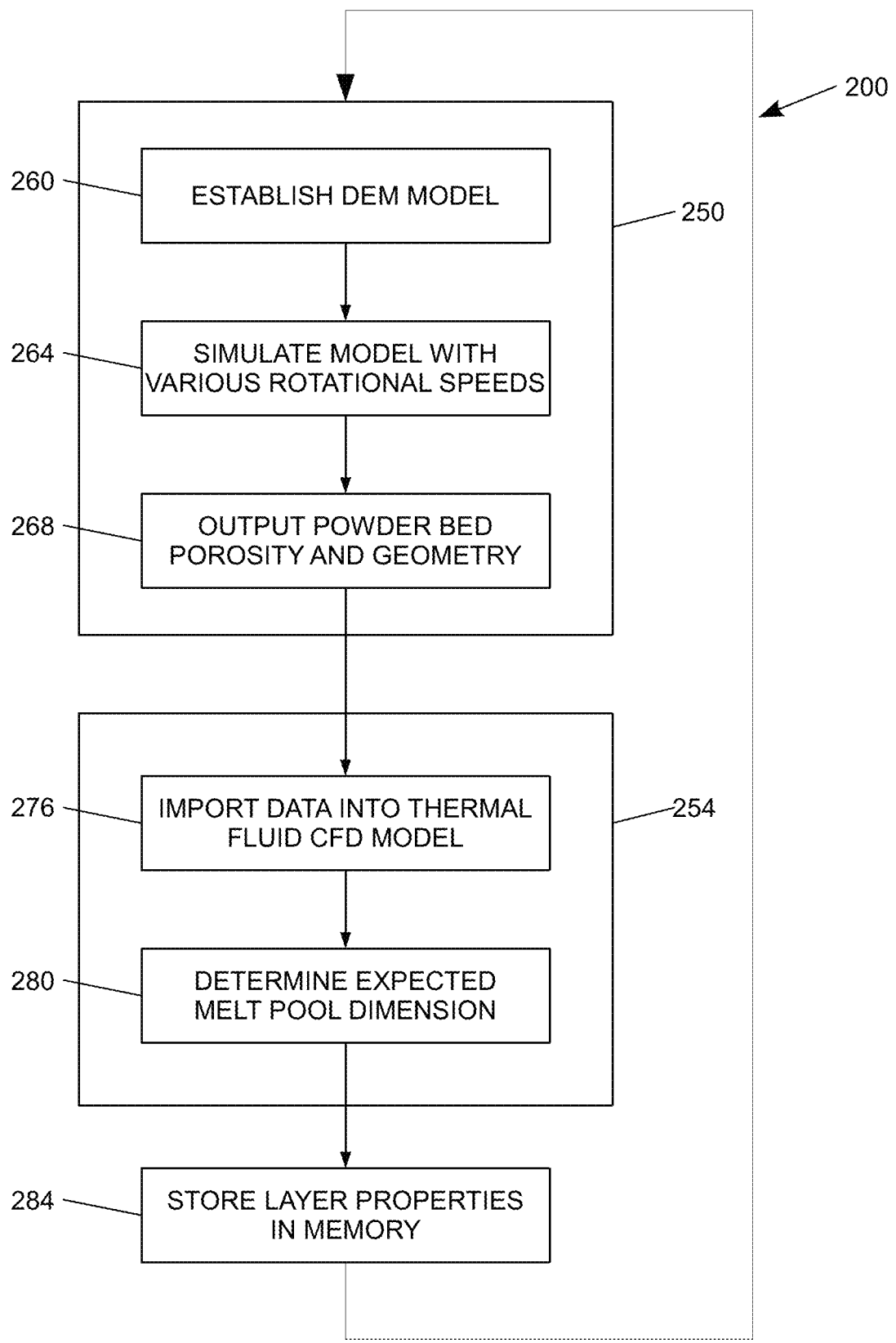
FIG. 2 is a process diagram of a method of performing a melt pool adjustment for a powder bed fusion additive manufacturing system such as the system of FIG. 1.
Figure 3:
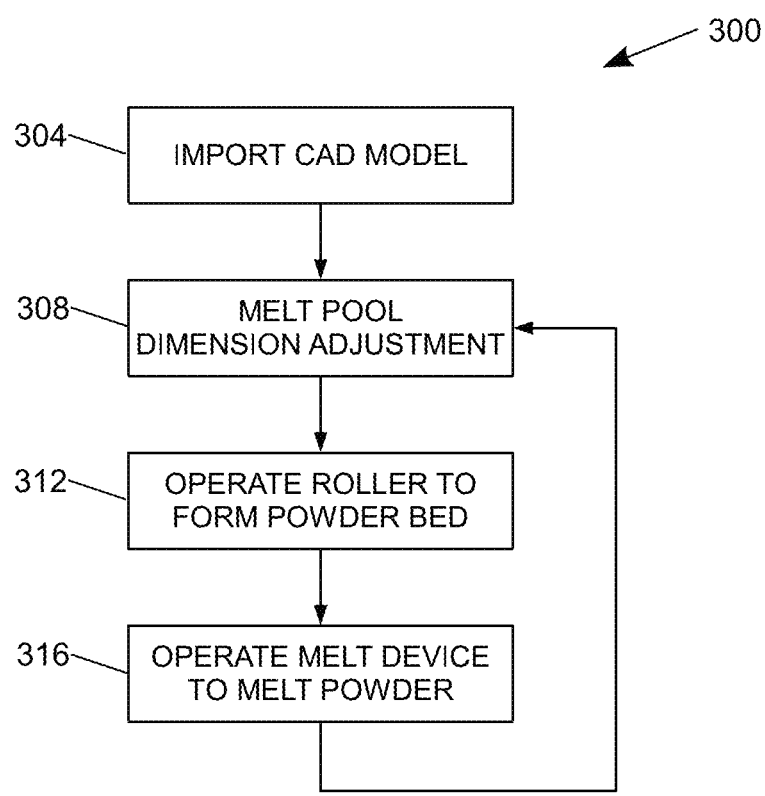
FIG. 3 is process diagram of a method of operating a powder bed fusion additive manufacturing system, such as the powder bed fusion additive manufacturing system of FIG. 1, to produce a build object.

The processors, the memory, and interface circuitry configure the controller 120 to operate the additive manufacturing system 100 according to the process 200 illustrated in FIG. 2 and the process 300 illustrated in FIG. 3 to build the build object 150 by dynamically changing the rotational speed of the roller 160 based on the desired properties of the build object.

FIG. 2 illustrates a melt pool determination process 200 in which the properties of the melt pool corresponding to various rotational speeds at which the roller 160 is operated are determined. In some embodiments, the melt pool determination process 200 is performed by the controller 120 of the powder bed fusion additive manufacturing system 100. In other embodiments, the melt pool determination process 200 is performed by a separate processor or computer arrangement, and the data determined from the melt pool determination process is stored in a memory associated with the controller 120.

The melt pool determination process 200 is divided into a powder bed generation simulation to simulate powder bed porosity under different roller rotational speeds (block 250) and a melt pool simulation based on the simulated powder bed porosity (block 254).

The powder bed simulation model includes first establishing a discrete element method (DEM) model to simulate the powder layer generation on previously solidified material, for example the build platform surface 140 or a previously completed portion of the build object 150. In the DEM model, to accurately capture the compaction characteristics of the powder bed, the model may perform three simulation steps, illustrated in FIGS. 4A-4D. First, simulated powder particles 300 are generated in a container with rigid walls around. Different sized particles 300 corresponding to the properties of the powder particles 132 used in the build object 150 are simulated and all the particles 300 are randomly distributed in a cloud (FIG. 4A).

Figure 4B:
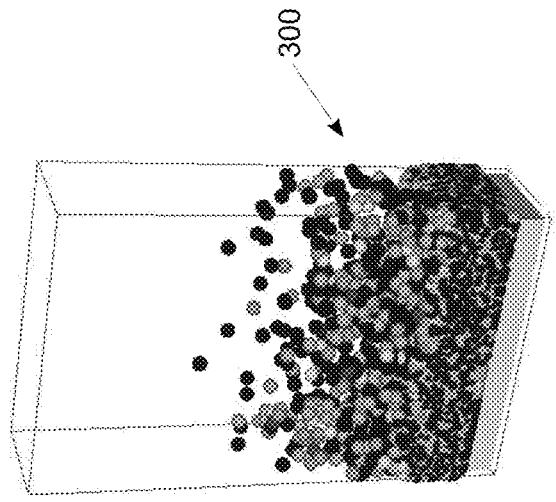
FIG. 4B is an illustration of the powder particle distribution of FIG. 4A falling under the simulated force of gravity.
Figure 4A:
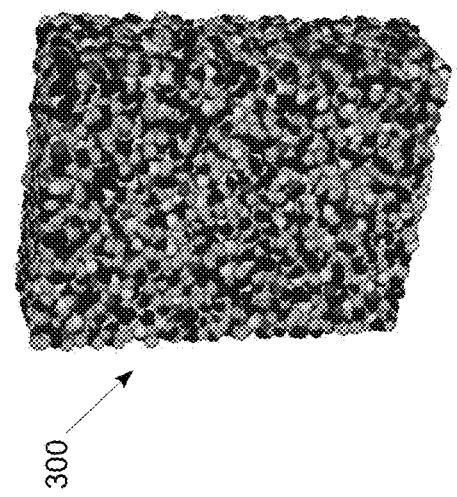
FIG. 4A is an illustration of a powder particle distribution used in the discrete element model (DEM) model in the method of FIG. 3, in which different shades represent different particle sizes.
Figure 4C:
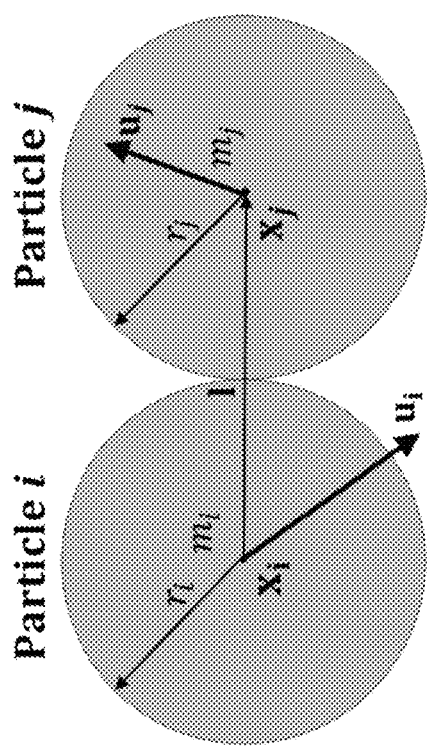
FIG. 4C is a schematic view of two powder particles from the DEM model illustrating the forces acting on the particles.

Next, illustrated in FIG. 4B, the simulated particles 300 are dropped freely into the container under standard simulated gravity. The powder particles were assumed as perfect spheres with different radii and all substrates or walls were assumed as rigid. Newton's second law of motion can be solved by DEM to calculate individual particle velocities in (x, y, z) directions including translational and rotational components. The particle-to-particle force determination is expressed in FIG. 4C and equations (1)-(3) as follows:

Particle contact force in normal direction:

$$F_{ni} = -kdln - \eta_n(u' \cdot n)n. \quad (1)$$

Particle contact force in tangential direction:

$$F_{ti} = -\eta_t(u' - (u' \cdot n)n); \quad (2)$$

$$F_i = F_{ni} + F_{ti} = -F_j; \quad (3)$$

$$l_0 = r_i + r_j;\ 1 = x_j - x_i;\ dl = l_0 - \|1\|;\ n = \frac{1}{\|1\|};\ u' = u_j - u_i,$$

where $x_i$ is a coordinate vector of an individual particle, $r_i$ is particle radius, k is spring constant, $m_i$ is particle mass, $u_i$ is particle velocity vector, $\eta$ is drag coefficient.

Figure 5B:
FIG. 5B is a perspective view of the simulated roller distributing the simulated powder particles of FIG. 4B.
Figure 5A:
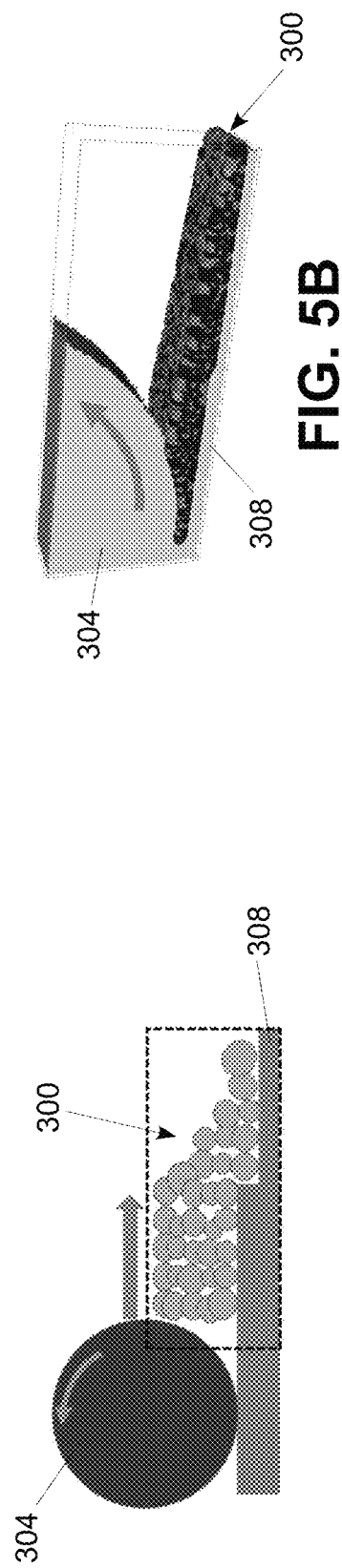
FIG. 5A is a schematic side view of the simulated roller distributing the simulated powder particles of FIG. 4B.
Figure 5C:
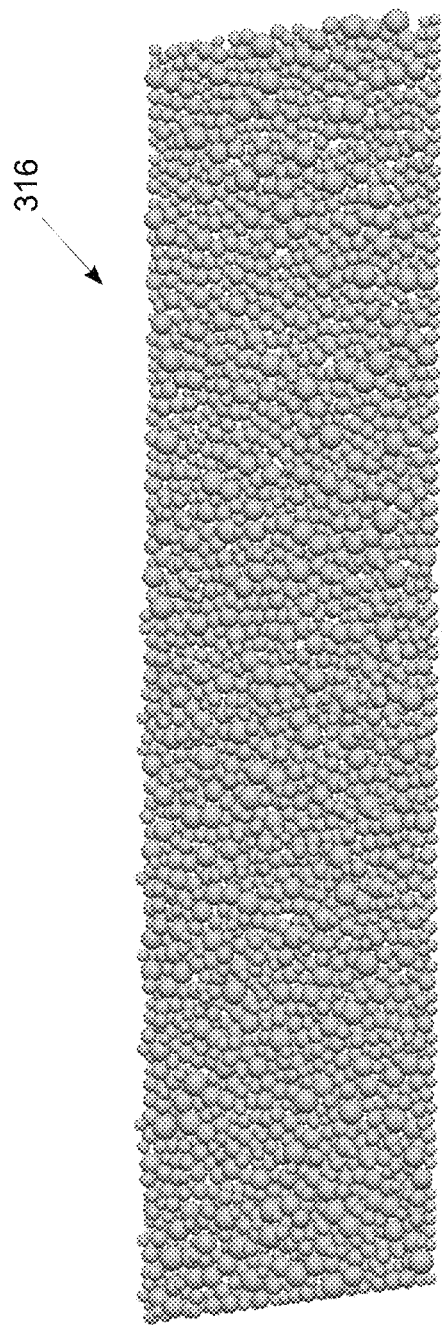
FIG. 5C is an illustration of the simulated powder bed resulting from the distribution model of FIG. 4C.

A simulated roller 304 is then moved across the simulated particles 300 with a desired translational and rotational speed to spread one layer of the powder across the solid substrate 308 (FIGS. 5A and 5B). The resulting geometrical information of the generated power bed 316 (FIG. 5C) is then exported for further analysis.

Referring back to FIG. 2, the DEM model is then simulated for various rotational speeds of the roller to obtain a variety of simulated powder beds (block 264). After the DEM model has been simulated with some or all of the desired rotational speeds, or after each individual model simulation, the DEM model outputs the powder bed porosity and geometry for the various rotational speeds to the melt pool simulation 254 (block 268). In some embodiments, the output geometrical information may be exported in an STL (stereolithography CAD) format.

The powder porosity and geometry data output from the DEM model is imported into a thermal computational fluid dynamics (CFD) model that simulates the complex thermal fluid processes in powder bed fusion additive manufacturing processes (block 276). The model then performs a simulation to determine the expected dimensions of the powder bed melt pool for the provided powder porosity and geometry data (block 280).

Figure 6:
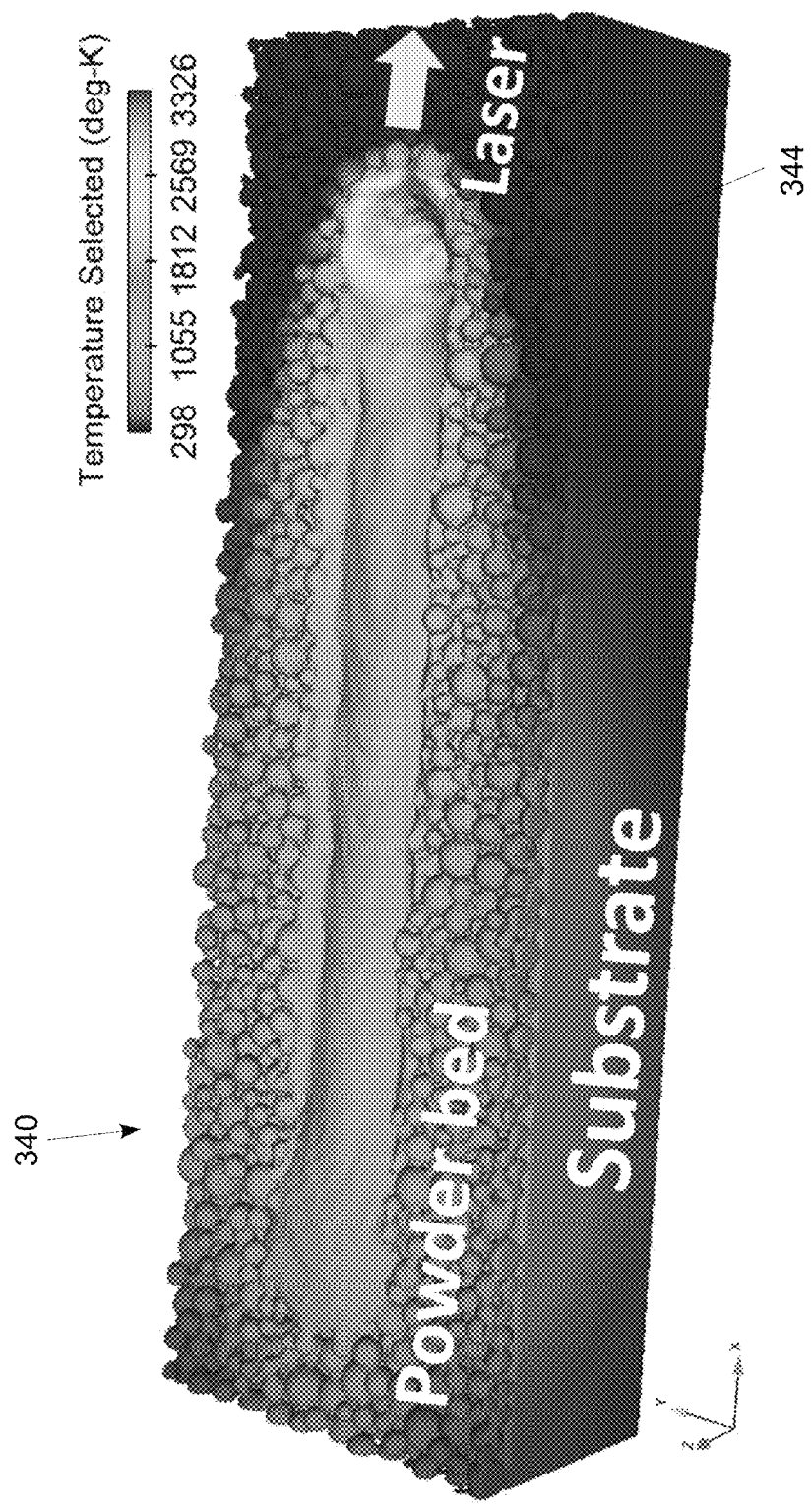
FIG. 6 is an illustration of a powder bed melt simulation from the thermal CFD model used in the method of FIG. 3.

The CFD model simulates Gaussian heat source, for example a simulated laser beam or electron beam, moving across the powder bed 340 (FIG. 6), and simulates the material phase transformation (solid to liquid, liquid to gas vapor), surface tension force, evaporation pressure and thermal fluid properties of the powder bed 340 and solid substrate 344 (FIG. 6). In one embodiment, the energy beam is modeled as a moving heat flux with a Gaussian distribution on top of the powder bed according to the following equation:

$$Q = \frac{2A_b P_L}{\pi \phi_e} \exp\left(-2\frac{(x-x_s)^2 + (y-y_s)^2}{\phi_e^2}\right), \quad (13)$$

where Q is the instant surface heat flux, $A_b$ is the absorption coefficient, $P_L$ is the laser power, $\Phi_e$ is the laser diameter, $x_S$ and $y_S$ are the horizontal positions of the laser beam center. The laser beam travels along the x-axis with a given speed at the top surface of the powder particles 340.

The complicated physical processes such as melting, phase change and melt pool flow in the SLM process are numerically solved using the CFD model. In the CFD model, the melt pool is considered to be an incompressible, laminar, and Newtonian fluid. The governing equations of mass, momentum and energy conservation are as follows:

Mass:

$$\nabla \cdot \vec{v} = 0; \quad (4)$$

Momentum:

$$\frac{\partial \vec{v}}{\partial t} + (\vec{v} \cdot \nabla)\vec{v} = -\frac{1}{\rho}\nabla P + \mu \nabla^2 \vec{v} + \vec{g} + F_b; \quad (5)$$

Energy:

$$\frac{\partial h}{\partial t} + (\vec{v} \cdot \nabla)h = -\frac{1}{\rho}(\nabla \cdot k\nabla T) + \dot{q}, \quad (6)$$

where t is the time, $\vec{v}$ is the velocity of melted material, P is the pressure, $\rho$ is mass density, $\mu$ is viscosity, g is gravity, $F_b$ is force term, h is enthalpy, k is material thermal conductivity, T is temperature, is heat source term.

The latent heat of fusion is considered in the model to simulate the solidus to liquidus phase transformation. When the material temperature is between the solidus and liquidus temperature, an additional energy term is to the internal enthalpy. The enthalpy equation is defined as follows:

$$h = \int C_p dT + L_f f, \quad (7)$$

where f is the volumetric fraction of liquid determined by temperature:

$$f = \begin{cases} 0, & T < T_s \\ \dfrac{T - T_s}{T_L - T_s}, & T_s \le T \le T_L, \\ 1, & T > T_L \end{cases} \quad (8)$$

where $C_p$ is material specific heat, $L_f$ is latent heat of fusion, $T_s$ and $T_L$ are material solidus and liquidus temperatures, respectively.

The volume of fluid (VOF) method was introduced to track the instant free surface evolution of the melt pool. In VOF the term, F, is defined as the fluid volume fraction (0≤F≤1). A void cell (no fluid) is defined as F=0 while a cell fully filled with fluid is defined as F=1. Thus, a cell that is partially fluid and partially void is represented as 0<F<1. The VOF equation is described as:

$$\frac{\partial F}{\partial t} + \nabla \cdot (\vec{v}F) = 0. \tag{9}$$

The Marangoni effect strongly affects the melt pool surface morphology and convection heat transfer. Thus, a surface tension term was included in the model to describe the main driving forces for fluid flow in the melt pool. The temperature dependent surface tension force is as follows:

$$\gamma(T) = \gamma_m + \frac{d\gamma}{dT}(T - T_m), \tag{10}$$

where $\gamma$ is the surface tension at temperature T, $\gamma_m$ is the surface tension at melting (liquidus) temperature $T_m$ and $$\frac{d\gamma}{dT}$$

is the temperature coefficient of material surface tension.

Evaporation occurs when temperature exceeds the material boiling point. A significant amount of energy will be carried away by escaped metal vapor from melt pool surface. The implementation of evaporation effect to the numerical model can have a substantial influence on the simulated maximum temperature. Thus, the heat loss due to evaporation is defined as:

$$Q_{evap} = \frac{0.82\Delta H_v}{\sqrt{2\pi MRT}} P_0 \exp\left(\Delta H_v \frac{T - T_b}{RTT_b}\right), \tag{11}$$

where $\Delta H_v$ is the enthalpy of metal vapor, M is molar mass, $P_0$ is the saturation pressure, R is gas constant and $T_b$ is material boiling temperature.

Additionally, the evaporation effect on the melt pool morphology is modeled by introducing a recoil pressure term over the free surface of melting region. The recoil pressure is given as:

$$P_r = 0.54 P_0 \exp\left(L_v \frac{T - T_b}{RTT_b}\right), \tag{12}$$

where $L_v$ is the latent heat of evaporation.

The result of the processor implementing the CFD model produces a model of the melting of the powder bed and substrate and fusion thereof that forms the new layer. FIG. 6 illustrates the results of the CFD model in which powder particles of the powder bed 340 are fused to the substrate 344, thereby adding the fused portion to the build object.

The rotational speeds simulated in the melt pool determination process 200 may range, for example, from zero to 9.42 (3π) rad/s. In some embodiments, the melt pool determination process 200 may include simulating clockwise rotational speeds (expressed herein as negative rotational speed values) or rotational speeds greater than 9.42 rad/s.

For instance, the melt pool determination process 200 may, in some embodiments, range from −9.42 rad/s or lower to 18.85 (6π) rad/s or higher. In various embodiments, the melt pool determination process 200 may be performed for any suitable rotational speeds within any range of rotational speeds. The number of rotational speed values simulated in the melt pool determination process 200 may range from 2 to 1000, or more, or any range of numbers encompassed therein. In one particular embodiment, the melt pool determination process 200 includes modeling rotational speeds at each multiple of π/2 from 0 to 3π (e.g. 0 rad/s, π/2 rad/s, π rad/s, 3π/2 rad/s, 2π rad/s, 5π/2 rad/s, and 3π rad/s).

Referring back to FIG. 2, the simulated melt pool resulting from each of the powder bed porosities is then stored as data in the memory associated with the controller 120 (block 284). The data may be stored on a simulation-by-simulation basis in the memory, or the data for all simulations may be stored simultaneously in the memory. As discussed below, the stored melt pools are used to determine the roller rotational speed on a layer-by-layer basis to produce the desired properties of each layer of the build object.

FIG. 3 illustrates a process 300 for producing a build object using, for example, the powder bed fusion additive manufacturing system 100 of FIG. 1. The process 300 begins by importing the CAD model of the build, and slicing the model to form a plurality of layers (block 304). The sliced layers provide the information regarding the necessary thickness of the build object layers, and the thickness of powder particle layers necessary to produce the build object 150.

Next, the process 300 proceeds with a melt pool dimension adjustment in which the controller determines the target rotational speed of the roller (block 308). The roller rotational speed may, for example, be selected as the speed that produces the melt pool in which the dimensions most closely match the desired dimensions for the layer, and/or the layer in which the melt pool provides sufficient depth into the previous layer so as to provide strength to the build object. The roller rotational speed corresponding to the selected melt pool is then used as the target rotational speed for the roller.

Once the melt pool dimension adjustment is complete (block 308) and the target roller rotational speed is determined, the controller operates the roller based on the determined target rotational speed to form the powder bed (block 312). In particular, with reference to FIG. 1, the controller 120 operates the actuator arrangement 164 to rotate the roller 160 at the determined rotational speed while translating the roller 160 across the build platform 108 or the build object 150 at the rotational speed used in the DEM model simulations 250. As the roller 160 moves across the build platform 108 and/or build object 150, the powder particles 132 are distributed into a powder bed layer with geometry and porosity similar to the properties of the simulated powder bed layer 316 (FIG. 5C) determined by the DEM model 250 corresponding to the target roller rotational speed.

Once the powder bed is formed with the desired geometry and porosity properties, the controller 120 operates the energy generator 116 to selectively melt the powder particles 132 in the powder bed (block 316). In one embodiment, the controller 120 operates the energy beam generator 180 to generate the energy beam 184, and operates the motors of the scanning device 188 to move the mirror 192 so as to direct the energy beam 184 at the particles 132 that are melted to form the layer of the build object 150, as determined by the sliced model from block 204. The energy from the energy generator 116 melts both the powder particles 132 and the substrate beneath the powder particles, which may be, for example, the previous layer of the build object 150. Once the melted portion cools, the powder particles 132 and the substrate are fused together, thereby adding a new layer to the build object.

The process then continues at block 308 with performing the melt pool dimension adjustment for the next layer or another portion of the layer. The rotational speed of the next layer or the additional portion of the first layer may result in a different rotational speed for the next layer or the additional portion of the layer. As such, in the method 200, the layers of the build object may be formed with varying different porosities, resulting in different properties for the various layers of the build object.

In the illustrated embodiment, the melt pool determination process 200 is performed ex situ and the data from the simulations is stored in the memory associated with the controller 120. In some embodiments, however, the melt pool determination process 200 is performed in situ during the build process. In such an embodiment, the simulations of the melt pool determination process are performed in the melt pool dimension adjustment (block 308) either layer-by-layer or in a pre-processing step for the entire imported build model before the operation of the roller and energy generator (blocks 312 and 316).

In some embodiments, the CAD model is sliced (block 304), the melt pool dimension adjustment is performed (block 308), and the roller and energy generator are operated (blocks 312 and 316) for each individual layer before repeating. The reader should appreciate that the various steps (blocks 304, 308, 312, 316) may be performed sequentially for each individual layer and then repeated for subsequent layers, or any or all of the steps may be performed for multiple layers or all layers of the build object before proceeding to the next step.

Figure 7:
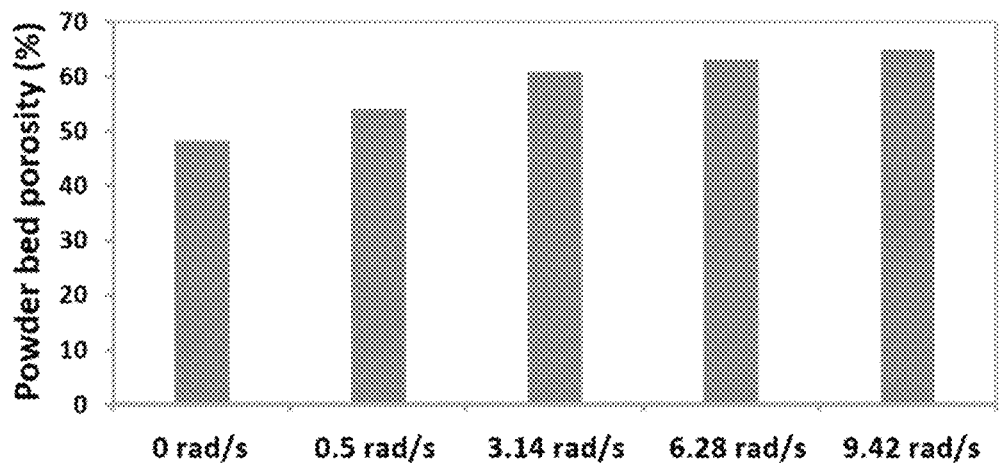
FIG. 7 is a chart showing results of porosity of powder beds against different counter-clockwise rotational speeds at which the roller was rotated using the DEM model of FIG. 3.
Figure 8:
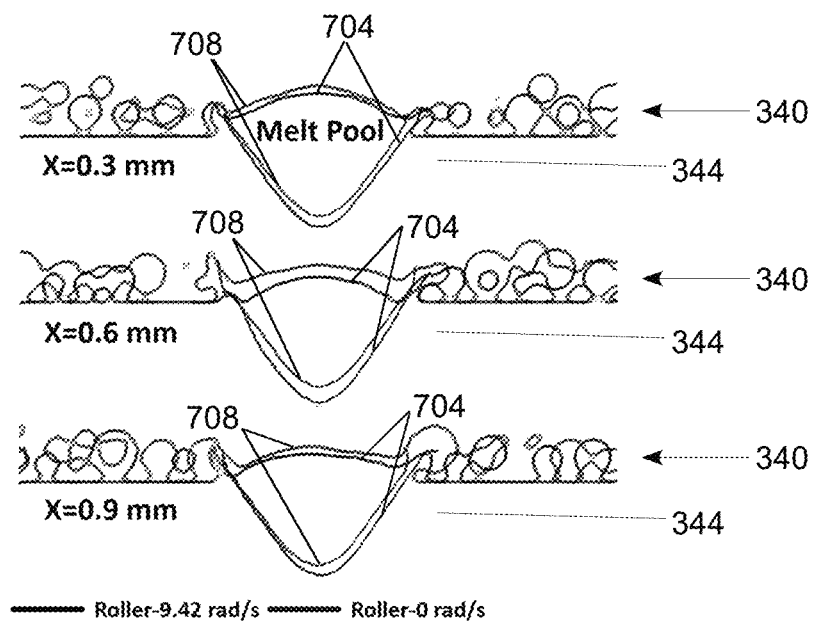
FIG. 8 is a diagram showing a comparison of three width-depth cross-sections of the melt pool at different locations of the scanning track (X,Y,Z location illustrated in FIG. 9) determined using the thermal CFD model for a first simulated powder bed created using a roller that was not rotated and for a second simulated powder bed created using a roller that was rotated at a rotational speed of 9.42 rad/s.

FIGS. 7-8 illustrate simulated results from the DEM and CFD models according to the melt pool simulation method 208 described above. FIG. 7 depicts a chart illustrating DEM model powder bed porosity results for five different rotational speeds in a system in which the remaining parameters were constant, determined using the DEM model 250 of FIG. 3. To obtain the simulated results of FIG. 7, a total of about 24000 powder particles were initiated above a rectangular container with rigid walls around, and different sized particles were generated and all the particles were randomly distributed in a cloud (see FIG. 4A). The particles were assumed to be H13 steel powder having a Gaussian distribution with D10, D50, and D90 of 19, 29 and 43 µm in diameter, respectively. The properties for the H13 steel particles are shown below in Table 1.

TABLE 1

Properties for H13 Steel Particles

| Property | Liquid | Solid |
|---|---|---|
| Conductivity, W × m$^{-1}$ K$^{-1}$ | 29 | 29 |
| Density, kg × m$^{-3}$ | 6900 | 7760 |
| Specific heat, J × kg$^{-1}$ K$^{-1}$ | 480 | 460 |
| Latent heat of fusion, J × kg$^{-1}$ | 2.5 × 10$^5$ | |
| Latent heat of evaporation, J × kg$^{-1}$ | 7.34 × 10$^6$ | |
| Dynamic viscosity, kg × m$^{-1}$ s$^{-1}$ | 5.0 × 10$^{-3}$ | |
| Surface tension, kg × s$^{-2}$ | 1.7 | |
| Surface tension coefficient, kg × s$^{-2}$ K$^{-1}$ | −0.43 × 10$^{-3}$ | |
| Liquidus temperature, K | 1727 | |
| Solidus temperature, K | 1588 | |
| Boiling temperature, K | 3133 | |
| Laser absorptivity | 0.63 | 0.63 |

The H13 steel particles were then allowed to drop freely to the container under standard gravity (see FIG. 4B), and the simulated roller 304 was used to spread the powder particles. The simulated roller 304 had a diameter of 5 mm and was simulated with a translational moving speed of 10 cm/s. Additionally, no external downward force was applied to the roller 304. Five different rotational speeds were modeled in FIG. 7: 0, 0.5, 3.14, 6.28 and 9.42 radians/s (rad/s).

As illustrated by the simulated results from the DEM model 250, the rotational speed of the roller 304 affects the porosity of the resulting powder bed. In particular, increasing the counter-clockwise rotational speed (counter-clockwise meaning that the leading edge of the forward-moving roller moves upwardly away from the particles) increases the powder bed porosity because the rotation of the roller results in more powder being removed from the domain. In the simulated results, the porosity varies from, for example, 48.3% when the roller 304 is not rotated during powder spreading to 65.1% when the roller is rotated at 9.42 rad/s.

The powder bed packing condition and porosity strongly affects the powder bed heat transfer, which governs multiple thermal-physical characteristics in the powder bed fusion process, for example melt pool dimension and surface morphology. FIG. 8 illustrates the results of two simulations from the CFD model 254, one of which used the powder bed porosity of 48.3% determined using the zero rotational speed DEM model, as discussed above with reference to FIG. 6, and the other of which used a powder bed porosity of 65.1%, as determined using the DEM model with a rotational speed of 9.42 rad/s. In the CFD simulation of FIG. 8, the energy generator was a 200 W laser, moved at a speed of 1000 mm/s, with a spot size of 52 µm, and the initial temperature was 298 K.

The images of FIG. 8 illustrate the cross-section of the melt pool width-depth in Y-Z plane of, for example, the melted portion seen in FIG. 5 at different locations of the scanning path, for example at x=0.3, x=0.6 mm, and x=0.9 mm. The darker line 704 in FIG. 8 represents the melt pool resulting from the simulated roller rotational speed of 9.42 rad/s in the counter-clockwise direction, while the lighter line 708 represents the melt pool resulting from no rotation of the roller. As can be seen from FIG. 8, the physical structure, particularly the shape, of the melt pool profile depends on the powder bed density. For example, the higher porosity resulting from rotating the roller (line 704) results in a smaller height of the melt zone above the substrate, while the lower porosity resulting from not rotating the roller (line 708) results in a deeper melt pool.

In addition, due to the reduced powder particle packing density from the rotated roller (represented by line 704), there is less solid volume available for melting as compared to the more dense packing of the zero-rotation powder bed. As a result, the beam energy is transferred to deeper location of the substrate below the powder bed in higher rotational speed operation of the roller. Compared to the zero-rotation powder bed (line 708), for example, the average re-melting depth (i.e. the melt depth of the solid substrate beneath powder bed) of the powder bed resulting from the roller rotated at 9.42 rad/s (line 704) is approximately 13% greater.

In conventional powder bed fusion processes, fixed process conditions are generally used to fabricate the build objects. For example, the laser power, speed, and spot size, the blade or roller speed used for powder spreading, and the layer thickness are generally kept constant throughout the build of an object. If different process parameters are needed to achieve different melt pool characteristics, a new build must be started because adjustment of melt pool condition is difficult after the build has started.

As discussed above with reference to FIGS. 7 and 8, the manipulation of powder bed porosity, which potentially governs the heat transfer process, controls melt pool dimensions in the process 300. In the process 300 according to the disclosure, the powder bed porosity is adjusted dynamically for different layers during the build of a single object to control melt pool dimension at different build heights. In some embodiments, the process 300 is performed with any or all of the other parameters of the build, for example the energy generator process parameters (as used herein, the term "process parameters" of the energy generator refers to the spot size, speed, and position of the energy generator), the roller translational speed, and the particle size distribution left constant, while only the roller rotational speed is adjusted dynamically during the build process 300. Thus, the resulting properties of the layers in the build object can be dynamically changed within the build, without adjusting the energy generator process parameters, by changing only the roller rotational speed or, in some embodiments, only the roller translational and rotational speed.

CFD Model Configuration

Figure 9:
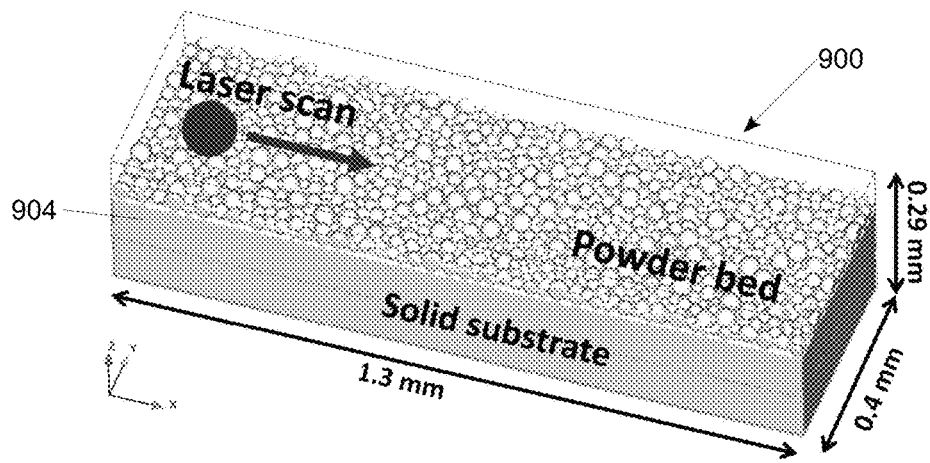
FIG. 9 is a perspective view of the domain used in the thermal CFD model.

The CFD model was developed using Flow Science, Inc. commercial software FLOW3D® to study the complex thermal fluid phenomenon in powder bed fusion processes, for example heat transfer, fluid flow and evaporation. The general model configuration is shown in FIG. 9. One powder layer 900 of the H13 steel is spread on top of a solid substrate 904, which is formed of the same material as the powder, was used to represent the newly spread powder layer. The geometrical information of individual powder particles are provided by an STL file generated with the DEM method (as described above). The laser beam travels along the x-axis with a given speed at the top surface of the powder particles. Due to relatively high laser energy input and small laser diameter, a fine mesh (3.5 μm) was used along the laser scanning path to produce reasonable simulation results. A coarser mesh (5 μm) was applied to the area away from the heat affected zone to reduce computational cost. The model has a domain dimension of 1.3×0.4×0.29 mm (x×y×z) and has a total number of 2.7 million cells. The upper region where no material is assigned was defined as void, its pressure was set to be one standard atmospheric pressure while the velocity was set to be zero. A continuative boundary condition was applied to all boundaries of the substrate so as to represent a smooth continuation of the flow through the boundary since zero normal derivatives was used at the boundary for all quantities.

Figure 10A:
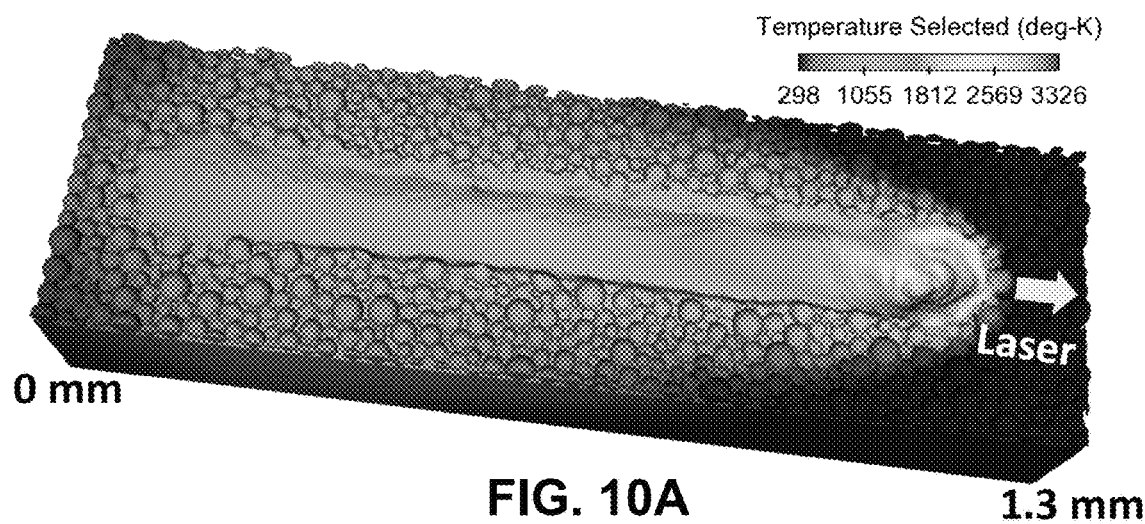
FIG. 10A is a perspective view of the domain of FIG. 9 after simulating a moving laser beam.
Figure 10B:
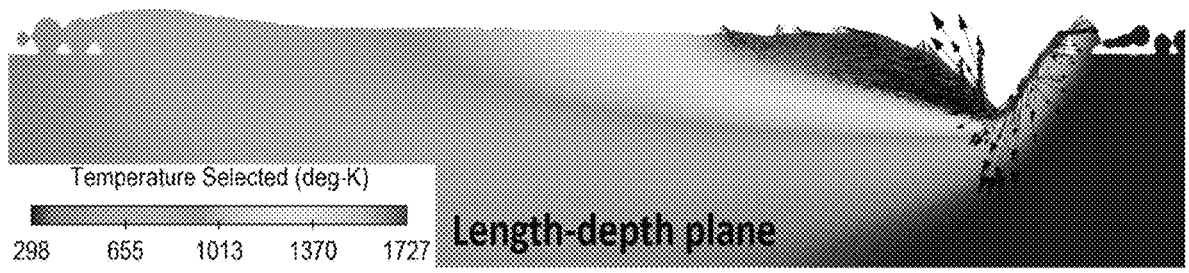
FIG. 10B is a lengthwise cross-sectional view of the domain of FIG. 9 after simulating the moving laser beam.
Figure 10C:
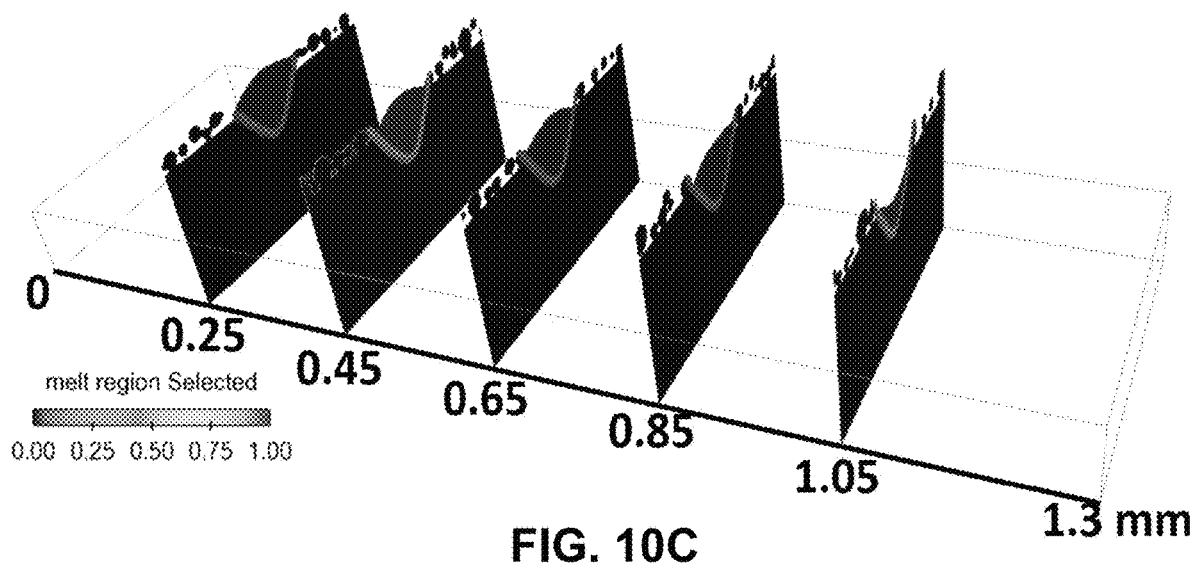
FIG. 10C is a perspective view showing five cross-sections of the domain of FIG. 9 after simulating the moving laser beam.

The CFD model is run with a single track melt pool simulation using the parameters in Table 1 and the experimental process conditions with the laser power of 200 W, laser speed of 1000 mm/s, spot size of 52 μm and the initial temperature of 298 K. The powder bed STL file from the powder spreading DEM simulation was incorporated. A 3D view of the simulated temperature field and surface morphology is shown in FIG. 10A, where the laser beam traveled along the scanning track. A smooth scanning track is formed, where the powder is melted and solidified. Partially melted particles are observed at the scanning track edges. A noticeable melt pool depression is shown in the laser beam center area at the end of the track, which is partially due to material evaporation induced recoil pressure. In this exemplary configuration, the evaporation effect was activated when the cell temperature exceeded the material boiling point. It was also observed that the maximum temperature predicted was around the material evaporation point (3133 K), which indicates the loss of excessive energy due to a liquid to gas phase change and which is captured by taking latent heat of evaporation into consideration. The melt pool fluid flow is depicted in FIG. 10B, with arrows representing flow vectors. It is clear that a strong backward flow (opposite to scanning direction) is formed in the length-depth plane. The surface tension force pushes the melt flow from the high temperature laser beam center to the cooler periphery, thus expanding melt pool area. The width-depth geometry at different locations in the scanning track is shown in FIG. 10C. There is slight difference in the melt pool top surface morphology due to the non-symmetric powder particle distribution.

Figure 11:
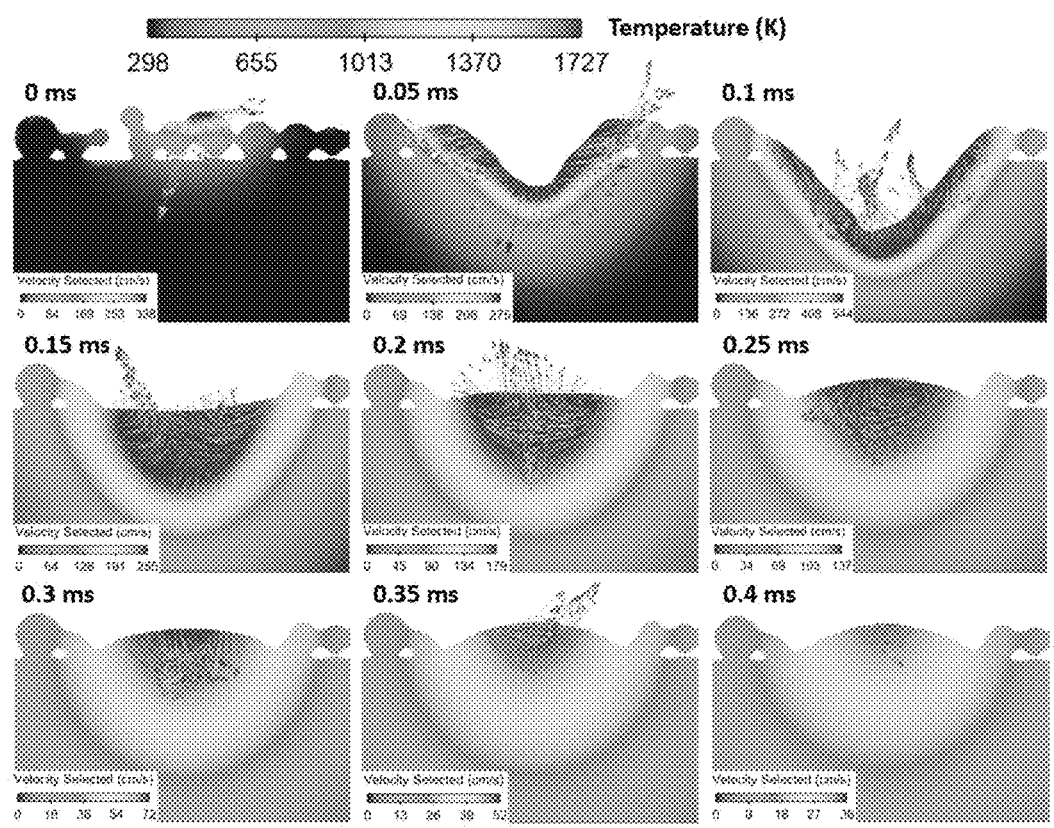
FIG. 11 illustrates a series of melt pool width-depth cross-sections taken at different times during the CFD model simulation.

The time dependent melt pool evolution of the CFD model is shown in FIG. 11 for a static width-depth plane in the melt pool. The temperature distribution as well as melt pool fluid flow have been plotted in 0.05 ms time increments. At 0 ms, the powder particles start to melt due to high laser input, and the liquid material flows both downward and outward. At 0.05 ms, the laser beam center moves toward the target plane, the substrate plate also melts and a depressed zone is formed due to a recoil pressure and the Marangoni effect. The melt pool continues to flow downward and outward. At 0.1 ms, a deeper valley-shaped melt pool is presented. At this point, the laser beam starts to move away from the target plane, thus upward flow is observed which brings the melt pool back into the neighboring void space. From 0.15 ms to 0.4 ms, the depressed zone is gradually replenished with molten material. Due to cooling and solidification of the melt pool, the flow velocity decreases with the increase of time. The maximum melt pool velocity is observed to be larger than 5 m/s at 0.1 ms. The high flow velocity indicates that there is strong melt flow recirculation. The Peclet number (Pe) is used to describe the contribution of convection and conduction; it is a ratio of heat transferred by convection to conduction, defined as the equation below:

$$P_e = \frac{\text{Heat by Convection}}{\text{Heat by Conduction}} = \frac{V_{liquid} \rho C_p L_R}{k}, \quad (14)$$

where $V_{liquid}$ is the typical liquid velocity, $L_R$ is the characteristic length (melt pool half width). Heat transfer will be dominated by convection in the melt pool if Pe is much larger than one. For this typical simulation, the Pe number is calculated to be about 31, which shows the convection is the main heat transportation mechanism in melt pool.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A powder bed fusion additive manufacturing system comprising:
   a build platform on which a substrate is supported;
   an energy generator configured to generate an energy beam directed at the substrate;
   a roller having an actuator system configured to rotate the roller; and
   a controller operably connected to the roller and to the energy generator, the controller configured to produce a build object by: (i) operating the actuator system based on desired properties of the build object to rotate the roller at a first rotational speed to spread powder particles at a first porosity on the substrate; (ii) operating the energy generator to selectively melt the powder particles and portions of the substrate adjacent to the selectively melted powder particles to form a first layer of the build object on the substrate; (iii) operating the actuator system based on the desired properties of the build object to rotate the roller at a second rotational speed to spread powder particles at a second porosity on at least one of the substrate and the first layer, the second rotational speed being different from the first rotational speed; and (iv) operating the energy generator to selectively melt the powder particles spread at the second porosity to form a second layer of the build object on the at least one of the substrate and the first layer, wherein:
operating the actuator system based on desired properties of the build object to rotate the roller at the first rotational speed includes determining the first rotational speed based on information stored a memory associated with the controller, the information including results of a discrete element method ("DEM") model and a thermal computational fluid dynamics ("CFD") model for a variety of simulated rotational speeds; and
operating the actuator system based on the desired properties of the build object to rotate the roller at the second rotational speed includes determining the second rotational speed based on the information stored the memory.

2. The powder bed fusion additive manufacturing system of claim 1, wherein the first rotational speed is between zero and 18.65 rad/s and the second rotational speed is between zero and 18.65 rad/s.

3. The powder bed fusion additive manufacturing system of claim 1, wherein the controller is configured to operate the actuator system to dynamically adjust a rotational speed of the roller between zero and 18.65 rad/s on a layer-by-layer basis.

4. The powder bed fusion additive manufacturing system of claim 1, wherein the controller is configured to maintain process parameters of the energy generator constant throughout the production of the build object.

5. The powder bed fusion additive manufacturing system of claim 4, wherein:
the actuator system is further configured to translationally move the roller; and
the controller is configured to operate the actuator system to move the roller at a constant translational speed while operating the actuator system to rotate the roller at the first rotational speed, and to operate the actuator system to move the roller at the constant translational speed while operating the actuator system to rotate the roller at the second rotational speed.

6. A powder bed fusion additive manufacturing system comprising:
a build platform on which a substrate is supported;
an energy generator configured to generate an energy beam directed at the substrate;
a roller having an actuator system configured to rotate the roller;
a controller operably connected to the roller and to the energy generator, the controller configured to produce a build object by: (i) operating the actuator system based on desired properties of the build object to rotate the roller at a first rotational speed to spread powder particles at a first porosity on the substrate; (ii) operating the energy generator to selectively melt the powder particles and portions of the substrate adjacent to the selectively melted powder particles to form a first layer of the build object on the substrate; (iii) operating the actuator system based on the desired properties of the build object to rotate the roller at a second rotational speed to spread powder particles at a second porosity on at least one of the substrate and the first layer, the second rotational speed being different from the first rotational speed; and (iv) operating the energy generator to selectively melt the powder particles spread at the second porosity to form a second layer of the build object on the at least one of the substrate and the first layer, wherein:
operating the actuator system based on desired properties of the build object to rotate the roller at the first rotational speed includes performing a first melt pool dimension adjustment that includes (i) determining first powder beds resulting from rotating the roller at a first plurality of rotational speeds using a discrete element method ("DEM") model simulation and (ii) determining layer properties of the first powder beds using a thermal computational fluid dynamics ("CFD") model simulation; and
operating the actuator system based on desired properties of the build object to rotate the roller at the second rotational speed includes performing a second melt pool dimension adjustment that includes (i) determining second powder beds resulting from rotating the roller at a second plurality of rotational speeds using the DEM model simulation and (ii) determining layer properties of the second powder beds using the thermal CFD model simulation.

7. The powder bed fusion additive manufacturing system of claim 6, wherein:
the first melt pool dimension adjustment further comprises selecting the first rotational speed based on a first comparison of the layer properties of the first powder beds determined using the thermal CFD model; and
the second melt pool dimension adjustment further comprises selecting the second rotational speed based on a second comparison of the layer properties of the second powder beds determined using the thermal CFD model.

8. The powder bed fusion additive manufacturing system of claim 6, wherein the controller is configured to operate the actuator system to dynamically adjust a rotational speed of the roller between zero and 18.65 rad/s on a layer-by-layer basis.

9. The powder bed fusion additive manufacturing system of claim 6, wherein the controller is configured to maintain process parameters of the energy generator constant throughout the production of the build object.

10. The powder bed fusion additive manufacturing system of claim 9, wherein:
the actuator system is further configured to translationally move the roller; and
the controller is configured to operate the actuator system to move the roller at a constant translational speed while operating the actuator system to rotate the roller at the first rotational speed, and to operate the actuator system to move the roller at the constant translational speed while operating the actuator system to rotate the roller at the second rotational speed.

11. A method of producing a build object with a powder bed fusion additive manufacturing system, comprising:

operating an actuator system that is operably connected to a roller based on desired properties of the build object to rotate the roller at a first rotational speed to spread powder particles at a first porosity on a substrate that is supported by a build platform;

operating an energy generator to generate an energy beam directed at the powder particles to selectively melt the powder particles and portions of the substrate adjacent the selectively melted powder particles to form a first layer of the build object on the substrate;

operating the actuator system based on the desired properties of the build object to rotate the roller at a second rotational speed to spread powder particles at a second porosity on at least one of the substrate and the first layer, the second rotational speed being different from the first rotational speed; and operating the energy generator to selectively melt the powder particles spread at the second porosity to form a second layer of the build object on the at least one of the substrate and the first layer, wherein:

operating the actuator system based on desired properties of the build object to rotate the roller at the first rotational speed includes determining the first rotational speed based on information stored a memory associated with the controller, the information including results of a discrete element method ("DEM") model and a thermal computational fluid dynamics ("CFD") model for a variety of simulated rotational speeds; and operating the actuator system based on the desired properties of the build object to rotate the roller at the second rotational speed includes determining the second rotational speed based on the information stored the memory.

12. The method of claim 11, wherein the first rotational speed is between zero and 18.65 rad/s and the second rotational speed is between zero and 18.65 rad/s.

13. The method of claim 11, further comprising:
operating the actuator system to dynamically adjust a rotational speed of the roller between zero and 18.65 rad/s on a layer-by-layer basis.

14. The method of claim 11, further comprising:
maintaining process parameters of the energy generator constant throughout the production of the build object.

15. The method of claim 14, further comprising:
operating the actuator system to move the roller at a constant translational speed while operating the actuator system to rotate the roller at the first rotational speed; and
operating the actuator system to move the roller at the constant translational speed while operating the actuator system to rotate the roller at the second rotational speed.

16. A method of producing a build object with a powder bed fusion additive manufacturing system, comprising:
operating an actuator system that is operably connected to a roller based on desired properties of the build object to rotate the roller at a first rotational speed to spread powder particles at a first porosity on a substrate that is supported by a build platform;

operating an energy generator to generate an energy beam directed at the powder particles to selectively melt the powder particles and portions of the substrate adjacent the selectively melted powder particles to form a first layer of the build object on the substrate;

operating the actuator system based on the desired properties of the build object to rotate the roller at a second rotational speed to spread powder particles at a second porosity on at least one of the substrate and the first layer, the second rotational speed being different from the first rotational speed; and operating the energy generator to selectively melt the powder particles spread at the second porosity to form a second layer of the build object on the at least one of the substrate and the first layer, wherein:

operating the actuator system based on desired properties of the build object to rotate the roller at the first rotational speed includes performing a first melt pool dimension adjustment that includes (i) determining first powder beds resulting from rotating the roller at a first plurality of rotational speeds using a discrete element method ("DEM") model simulation and (ii) determining layer properties of the first powder beds using a thermal computational fluid dynamics ("CFD") model simulation; and operating the actuator system based on desired properties of the build object to rotate the roller at the second rotational speed includes performing a second melt pool dimension adjustment that includes (i) determining second powder beds resulting from rotating the roller at a second plurality of rotational speeds using the DEM model simulation and (ii) determining layer properties of the second powder beds using the thermal CFD model simulation.

17. The method of claim 16, wherein:
the first melt pool dimension adjustment further comprises selecting the first rotational speed based on a first comparison of the layer properties of the first powder beds determined using the thermal CFD model; and
the second melt pool dimension adjustment further comprises selecting the second rotational speed based on a second comparison of the layer properties of the second powder beds determined using the thermal CFD model.

18. The method of claim 16, further comprising:
operating the actuator system to dynamically adjust a rotational speed of the roller between zero and 18.65 rad/s on a layer-by-layer basis.

19. The method of claim 16, further comprising:
maintaining process parameters of the energy generator constant throughout the production of the build object.

20. The method of claim 19, further comprising:
operating the actuator system to move the roller at a constant translational speed while operating the actuator system to rotate the roller at the first rotational speed; and
operating the actuator system to move the roller at the constant translational speed while operating the actuator system to rotate the roller at the second rotational speed.

* * * * *